United States Patent
Chraiet et al.

(10) Patent No.: US 7,788,317 B2
(45) Date of Patent: Aug. 31, 2010

(54) LOCATION-BASED METHOD AND SYSTEM FOR DYNAMICALLY MANAGING NETWORK PHYSICAL OBJECTS

(75) Inventors: Naoufel Chraiet, Grenoble (FR); Gilles Privat, Meylan (FR); Jean-Paul Viboud, Le Touvet (FR)

(73) Assignee: France Telecom, Paris (FR)

( * ) Notice: Subject to any disclaimer, the term of this patent is extended or adjusted under 35 U.S.C. 154(b) by 552 days.

(21) Appl. No.: 10/558,529

(22) PCT Filed: May 25, 2004

(86) PCT No.: PCT/FR2004/001292
§ 371 (c)(1),
(2), (4) Date: Nov. 28, 2005

(87) PCT Pub. No.: WO2004/110014
PCT Pub. Date: Dec. 16, 2004

(65) Prior Publication Data
US 2007/0011285 A1    Jan. 11, 2007

(30) Foreign Application Priority Data
May 28, 2003 (FR) .................. 03 06497

(51) Int. Cl.
*G06F 15/16* (2006.01)

(52) U.S. Cl. ................................ 709/203

(58) Field of Classification Search .............. None
See application file for complete search history.

(56) References Cited

U.S. PATENT DOCUMENTS

| | | | | |
|---|---|---|---|---|
| 6,470,189 B1 * | 10/2002 | Hill et al. | ...................... | 455/517 |
| 6,526,275 B1 * | 2/2003 | Calvert | ...................... | 455/418 |
| 6,665,549 B1 * | 12/2003 | Reed | ...................... | 455/573 |
| 6,748,195 B1 * | 6/2004 | Phillips | ...................... | 455/41.2 |
| 6,888,811 B2 * | 5/2005 | Eaton et al. | ................ | 370/338 |
| 6,931,429 B2 * | 8/2005 | Gouge et al. | ................ | 709/203 |
| 2003/0065710 A1 * | 4/2003 | Oakeson et al. | ............. | 709/203 |
| 2003/0074422 A1 | 4/2003 | Montemurro et al. | ....... | 709/219 |

FOREIGN PATENT DOCUMENTS

WO    WO 97/41654    11/1997

OTHER PUBLICATIONS

International search report dated Nov. 11, 2004 with English translation (4 pgs).

* cited by examiner

*Primary Examiner*—Hussein Elchanti
*Assistant Examiner*—Clayton R Williams
(74) *Attorney, Agent, or Firm*—Drinker Biddle & Reath LLP

(57) ABSTRACT

A service directory lists information on service provider communicating objects, on related services accessible from these communicating objects and on coverage areas associated with these services. When a service consumer communicating object is located and identified, a list of accessible services is determined depending on the location and identification of this service consumer communicating object, in relation to the directory services to the coverage areas associated therewith, and at least the transmission to the identified service consumer communicating object of information relating to the services of the determined list is triggered.

4 Claims, 2 Drawing Sheets

LOCATION-BASED METHOD AND SYSTEM FOR DYNAMICALLY MANAGING NETWORK PHYSICAL OBJECTS

RELATED APPLICATIONS

The subject application is a U.S. National Stage application that claims the priority of International Application No. PCT/FR2004/001292, filed on 25 May 2004, which claims the priority of French National Application No.: 03/06497, filed on 28 May 2003.

FIELD OF INVENTION

Background of the Invention

The present invention relates to the field of communicating objects and, more specifically, the field of managing a set of such objects. These communicating objects are objects having a specific function and provided with communication capabilities. More specifically, a communicating object is a pair of hybrid state machines, one physical and the other informational. The distinction is more intuitive than formal, since an informational state machine is obviously implemented on a physical machine, normally microelectronic, and a physical machine can always be modeled at various levels as a formal state machine. The distinction between the two is nevertheless normally clear enough for it to be possible to model them separately: the informational state machine includes the "embedded" processing/storage capability of the object in the sense defined above, and the physical machine includes everything corresponding to the specific function, that is, non-informational, of the object, including both the physical interfaces of the sensors and actuators and the state machine which models their abstract operation.

Jointly, this dual state machine is provided with capabilities for:
- acquiring information from its own physical state or, where appropriate, from its environment, via sensors in different physical arrangements,
- locally processing and storing information (informational state machine functions in the strict sense, that is, including the state of the state machine and the state transition function based on the inputs that are the sensors and the network interfaces),
- sending the information deriving from the sensors or from the specific state of the object to other objects, and receiving information from other objects, via a general-purpose network medium, typically wireless, and supporting a protocol enabling them all to interwork,
- performing actions in return on its own physical state or, where appropriate, on the environment, via embedded actuators.

The combined informational processing and physical transduction (sensors and actuators) capabilities of the networked objects are seen hereinafter through an information technology abstraction called here "service", which can be formalized, in the software infrastructure that manages them, in a declarative manner (for example, by describing these capabilities in an XML-based language) or programmatic manner (for example, a method or a set of methods in an object-based programming language such as Java). It is this service computational entity which will be "exchanged" via the network between "service consumer" communicating objects and "service provider" objects, bearing in mind that the objects serve both functions most of the time.

There are numerous types of communicating objects that interact by exchanging services: typical of these are the drinks dispenser with payment made by mobile telephone, the communicating pen, which provides an input interface service for a personal digital assistant (PDA), the wireless earpiece which provides a voice interface service for a mobile telephone or even the screen which provides a visual output interface service for a PDA, the temperature and pressure sensor which provides its information to another service located on the PDA, and so on.

The service discovery software infrastructures (middleware) include in particular:
- JINI (see "JINI Network Technology", published by Sun Microsystems, Inc. and the web site www.jini.org);
- UPnP (see "Universal Plug and Play Device Architecture", published in June 2000 by Microsoft Corporation, and the web site www.upnp.org);
- Salutation, the specifications of which are published by The Salutation Consortium (see web site www.salutation.org).

These architectures propose generic solutions to enable software services to be exchanged between machines, but do not propose generic solutions for handling the physical location of software in concrete terms. Now, recognizing the physical location is essential for mobile communicating objects, for example attached to a roaming user.

Furthermore, the existing communicating objects and the associated management systems, which sometimes use location information originating for example from GSM networks, are often dedicated to a specific application or to a specific environment. Thus, making communicating objects that do not originate from the same system interact easily is difficult. Furthermore, activating these objects more often than not requires a specific activation on the part of the user.

OBJECTS OF THE INVENTION

The present invention seeks to propose a method and a system for managing a set of communicating objects which are less affected by the above-mentioned limitations.

Thus, according to a first aspect, the invention proposes a method of managing a set of communicating objects, wherein a service directory lists information relating to service provider communicating objects, to respective services accessible from these communicating objects and to coverage areas respectively associated with said services. The method comprises the steps of:
- locating a service consumer communicating object and identifying it,
- determining a list of the services accessible from the service provider communicating objects included in the directory, according to the location and the identification of the service consumer communicating object identified in relation to the services accessible from the service provider communicating objects and to the coverage areas associated with said services, and
- initiating at least the transmission, to the identified service consumer communicating object, of information relating to the services of the list.

According to a second aspect, the invention proposes a system for managing a set of communicating objects comprising:
- a service directory listing information relating to service provider communicating objects, to respective services accessible from these communicating objects and to coverage areas respectively associated with said services, means of locating and identifying service consumer communicating objects, means of interpreting information for locating the service consumer communicating objects regarding the coverage areas of the services listed in the directory, means of interpreting in formation for identifying the service consumer communicating objects regarding the services listed in the directory, means of determining a list of services accessible from service provider communicating objects included in the directory, according to the results provided by the means of interpreting the information for locating and identifying the service provider communicating objects, means for initiating at least the transmission of information relating to the services of the list to a service consumer communicating object.

The coverage areas, from which the services may be accessible, are defined according to the model of the underlying space (concrete or abstract) used by the means of locating and interpreting the location information.

It can be a conventional geometrical model. In this case the term proximity is used (as in a Cartesian, affine, etc. type model) in the sense of the distance in that model.

It may even be a graph type model. In this case, the term proximity on the graph is used (in other words the distance estimated as the number of arcs on the shortest path separating two nodes of the graph).

Implementing a method or a system according to the invention enables services to be proposed dynamically to service consumer objects likely to use them, by analyzing location information relating to the coverage areas of the services accessible from service provider objects, and to the location of the service consumer object.

The service directory can be centralized, or even distributed on a number of physical machines located at different geographic points.

The information relating to the location of the objects and to the coverage of accessible services can moreover be of different types and be supplied by different technology devices coexisting within the same system.

BRIEF DESCRIPTION OF THE DRAWINGS

Other characteristics and advantages of the invention will become apparent from reading the description that follows. This is purely illustrative and should be read in light of the appended drawings in which:

FIG. 1 represents a system 2 for managing communicating objects 3 in an embodiment of the invention. The communicating objects 3 include service provider communicating objects 3a and service consumer communicating objects 3b. The service provider communicating objects 3a are provided with means or functions enabling them to interact with their environment (sensors or actuators) and provide services, in particular to service consumer communicating objects 3b. It will be seen that a communicating object 3, whether fixed or mobile, can, in turn or at the same time, be both service consumer and service provider.

Figure 1:
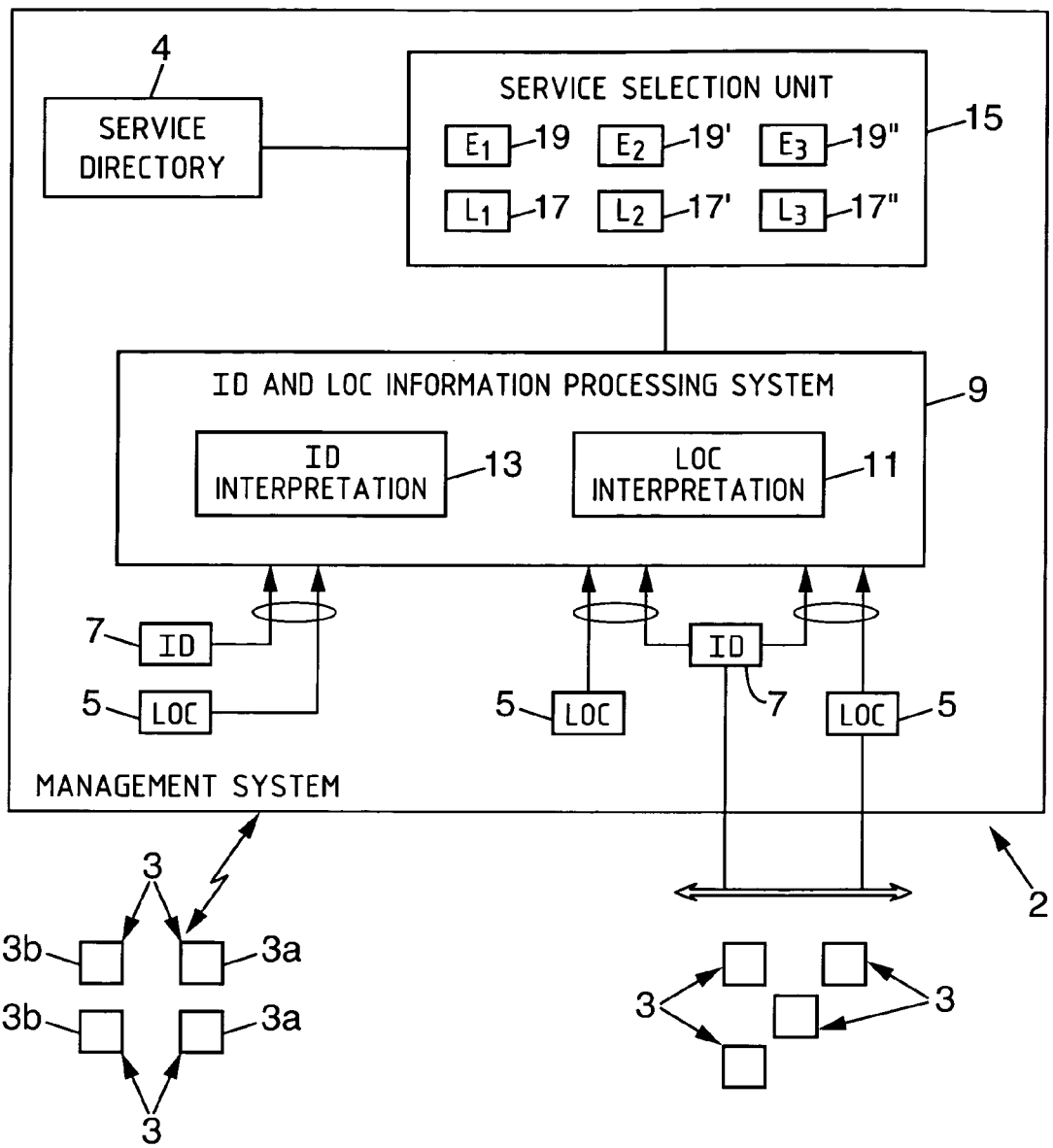
FIG. 1 represents a system for managing communicating objects in a first embodiment of the invention.

This management system 2 includes, for example, a number of location means 5, each suitable for locating service consumer communicating objects 3b (this location is, for example, initiated either by the communicating object itself which appears active to the system 2, or directly by the system 2).

Location means 5 based on various technologies can coexist in the management system 2. The location means can, for example, be complete multi-sensor positioning systems (GPS or triangulation by IEEE 802.11 terminals), or even isolated sensors associated with software agents combining raw information from sensors, or even positioning information entered permanently on installing fixed or rarely-moved objects. Thus, the location information issued by the location means 5 can be of widely varying types: a communicating object 3 can, for example, be located by longitude and latitude. Another communicating object may be located by the form "present on the local IP network of Mr X, resident at Y", and so on.

The system 2 further includes means of identifying communicating objects 7, suitable for identifying service consumer communicating objects 3b after location.

The supervision system 2 includes a system 9 for processing the location and identification information. This processing system 9 includes means of interpreting location information 11 from the location means 5 and means of interpreting the identification information 13 from the identification means 7. The location information interpretation means 11 of the system 9 are suitable for processing the variety of location information received in order to extract from it the relevant information, according to criteria which can be programmable. They can, for example, use the location information relating to a located service consumer object 3b to identify which service coverage areas are "relevant" for the identified and located service consumer communicating object. Depending on the criteria entered, "relevant" might be understood to mean, for example, those service coverage areas within which the identified object is located, but also nearby coverage areas, or coverage areas that would require an easily-accomplished action on the part of the located consumer communicating object 3b, for example a network connection. The processing system 9 can also, for example, establish the relationship between location information of varying types. It can, for example, extract, from the continuous location information of a metric or Cartesian model, location information corresponding to a set model (the object is or is not within a given area).

The identification information interpretation means 13 of the system 9 are suitable for processing the various types of identification information received, in order to extract from it the relevant information according to criteria that can be programmable. They may, for example, use identification information relating to an identified object to define which services are "relevant" from the services in the directory, in other words, those services likely to be consumed by the located service consumer object, according to identification (for example, is the located consumer object defined in the system?), or, for example, identification parameters linked to relative technologies (for example, if particular services require a screen and the communicating object does not have one, there is no point in proposing such a service to the communicating object; such information may be included in the identification parameters) or even according to the user profile of the service consumer object, or even according to access rights paid for or not by the user associated with the communicating object.

The system 2 includes a service directory 4. This directory 4 lists information relating to the service provider objects 3a, to services accessible from the service provider objects 3a and to coverage areas associated with these services. The directory 4 can be compiled in various ways, for example according to the service provider communicating objects. Some parts may have been compiled in a system initialization phase, by the installer or the user of the communicating object 3a. For information relating to mobile objects, the directory 4 can be updated regularly, by interchange sessions between the directory 4 and the service provider communicating object or its user as appropriate (for example, on each new location of a service provider object 3a, as will be seen later).

The management system 2 further includes a service selection unit 15. This unit 15 includes means 17, for example software, of determining a list L1 of services accessible from service provider communicating objects included in the directory, according to results issued by the location information interpretation means 11 and the identification information interpretation means 13 of the service provider communicating objects. The final list may correspond to the services interpreted as "relevant" and associated with service areas interpreted as "relevant", relative to the service consumer communicating object 3b concerned.

The unit 15 also includes means 19 which will propose the services of the predefined list via the means 17 to a service consumer communicating object identified and located by the means 5 and 7. The means 19 will thus send a proposal concerning the listed services, direct to the service consumer communicating object, accompanied by the essential characteristics based on which the consumer object 3b can either consume services from the corresponding provider objects, or ask the directory for the exact details of the service so that it can then invoke the service. This data can be customized according to the object 3b. For example, if the latter has IP communication means, the IP address of the service provider object can be supplied. For another consumer object 3b, it will be, for example, the Bluetooth address, and so on.

Means of communication, for example, by access to wireless networks, enable the communicating objects 3 and the management system 2 to intercommunicate, directly or via a network.

In an embodiment, all of the component parts of the management system 2 are, for example, distributed at various geographic points and interlinked by networking.

Advantageously, the location means 5 and the identification means 7 are suitable for locating and identifying also the service provider communicating objects 3a. Moreover, the processing system 9 is designed to use the information relating to the location and identification of service provider communicating objects issued to update the various fields of the service directory. The location interpretation means 11 and the identification interpretation means 13 are suitable for jointly updating the coverage area of a service accessible from an identified and located service provider communicating object 3a. This update is performed on the basis of identification and location information (the coverage area of an object 3a providing services via local IP networks identified as such and located on a given IP network at the time of a new installation will consider its service coverage area for example equal to said IP network).

In a preferred embodiment of the invention, the service selection unit 15 includes means 17' for determining, for one or more services S accessible from an identified and located service provider communicating object 3a, a list $L_2$ of service consumer communicating objects 3b. The objects of this list $L_2$ are determined according to the service S and the associated coverage area, and this relative to the respective locations and identifications of the service consumer communicating objects, for example according to criteria equivalent to those considered for drawing up the list $L_1$ of service consumer communicating objects.

The service selection unit 15 includes means 19' suitable for initiating at least the transmission ($E_2$) of information relating to services accessible from the identified service provider communicating object 3a to service consumer communicating objects of the list $L_2$. The services S are thus proposed proactively, to the communicating objects likely to consume these services. All the services S can be proposed to the objects 3b of the list $L_2$. In an embodiment, services may be proposed selectively to the consumer objects 3b of the list $L_2$, for example according to identification information, in order to more effectively target the potential consumers 3b.

This characteristic can be used to inform the consumer objects 3b, for which at least one of the services of a service provider communicating object is "relevant", of the accessibility, for example after the service provider communicating object has moved.

Advantageously, a communicating object 3 can make a request to the management system 2.

This request includes a number of criteria, which may, for example, define one or more elements such as: service type, type of communicating object, service coverage area, or even other criteria corresponding to a field of the directory.

The request may, for example, define criteria such as: "services for children" type services, for which the coverage area includes the location of the imminent holidays of the user of the communicating object 3.

The service selection unit 15 includes means 17" for determining a list of services $L_3$ corresponding to the criteria of the request made by the communicating object 3.

To draw up the list $L_3$, account is advantageously taken, when no location criterion is specified in the request, of the location of the communicating object from which the request originated, in order to propose only services that are relevant (in terms of proximity) in relation to the communicating object.

The selection unit 15 also includes means 19" suitable for initiating the transmission of the result of the request ($E_3$) to the communicating object. This result may take the form of the defined list of services ($L_3$), with the information needed to access the listed services, where appropriate, when within the respectively associated coverage areas.

Figure 2:
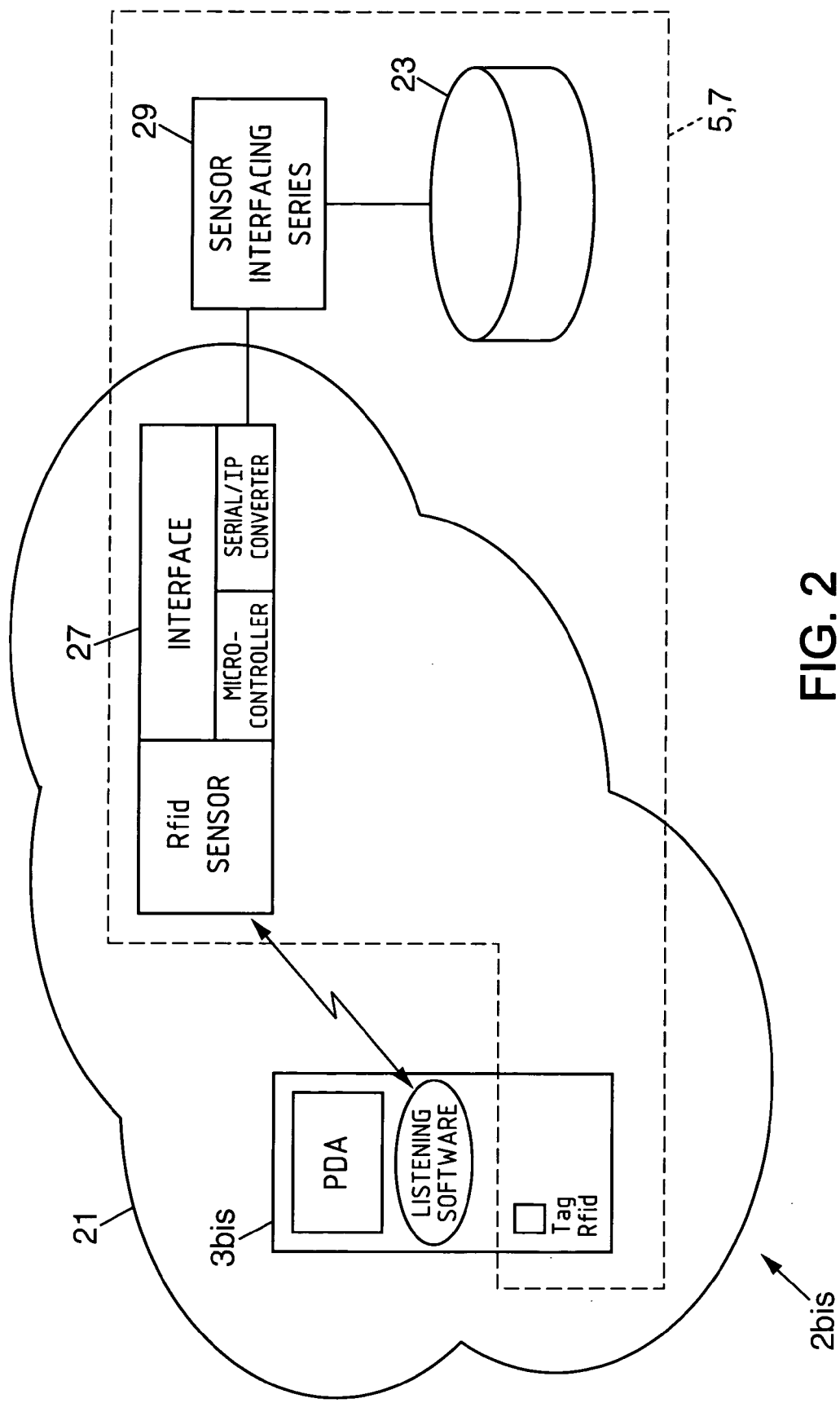
FIG. 2 represents a system of managing communicating objects in a second embodiment of the invention.

Now consider the particular case illustrated by FIG. 2 of embodiment of the invention in relation to a room 21 of a building, for implementing a "virtual terminal" service, which represent a subset 2bis of an overall system of the type described in FIG. 1 and including, for example, a number of technologies. The room 21 is equipped with a set of communicating objects 3 of various types. The set of communicating objects can be networked spontaneously via a JINI infrastructure and software written in JAVA relying on this infrastructure (see "The Java Language Specification", published by Sun Microsystems, Inc.).

An initialization phase of the system 2bis is carried out first, during which the service provider communicating objects 3a, according to the Jini mechanism, create, discover and register with the service directory 4 (not shown in FIG. 2). The subsystem 2bis initializes a shared memory space 23, for example Jini Javaspace. Moreover, service consumer communicating objects 3b each include a user equipped with a personal digital assistant (PDA) having an electronic tag. This electronic tag includes a transceiver and stores information relating to the identification of the PDA. It is, for example, compliant with the RFID standards (Radio Frequency Identification standards; refer to the web site www.RFID.org).

This tag will hereinafter be referred to as "RFID tag". These objects 3b will look for the directory 4, and an identification service to register their identification information and their means of communication with, in particular, the corresponding addresses (IP, electronic mail, Bluetooth identifier, etc.), and a registration service for registering as a service consumer. These identification and registration services are included in the identification means 7 described in the case of a system 1, typically combining a number of separate subsystem types.

The service consumer communicating object 3b shown in FIG. 2 comprises a user equipped with a PDA having an RFID tag and listening software embedded in the PDA, which makes the latter listen to its environment. A duly equipped generic PDA can download on-the-fly the various pieces of software or control interfaces transmitted, then release the resources when it no longer needs them.

The object 3b arrives in this room 21. It is detected by an RFID sensor 27 which dialogs with its RFID tag. The RFID sensor 27 includes an antenna, electronic circuits linked to an interface including serial/IP modules. It can set up an IP session (tunnel) with a sensor interfacing service 29, in order to send it the identification information corresponding to the RFID tag with which the object 3b is provided. The interfacing service 29 will create a new entry in the shared memory 23. This entry corresponds to an identifier of the sensor 27 which has detected the communicating object 3b and to the identifier corresponding to the detected tag. The arrival of this new entry will make it possible to identify the equipment which corresponds to the RFID tag (in practice, the RFID technology enables the PDA to be identified from the tag identification) and to locate the equipment using the identifier of the sensor. The identification and location operations are therefore performed at one and the same time in this case. The location and identification means 5, 7 described in relation to FIG. 1 in this case include the tag affixed to the PDA, the RFID tag reader 27 provided with its interface, the sensor interfacing service 29 and the shared memory space 23.

Once the list L1 of proximity services is determined (for example, the services available in the room) and if the communicating object 3b has indeed been registered as a client of the system in the registration service in the initialization phase, the subsystem 2a informs the object 3b (at at least one address included in the shared memory 23) that it can access a "virtual terminal" service, and provides it with the information to access that service. The PDA then invokes the "virtual terminal" service. Also, the requested service sends its interface, for example graphical, to show the list L1 of the determined services on the PDA.

This "virtual terminal" service is registered as a service, with the directory, with the identifier of the physical sensor that it represents as a parameter. The service coverage area can be defined, for example, as equal to the room 21, or even to the detection area of the sensor 27, or even the apartment, and so on.

Thus, everything proceeds as if the user associated with the communicating object 3b had interrogated a greeting terminal on entering the room, but according to the invention, it is the environment which proposes the service, in the example described in FIG. 2 of the "virtual terminal" type, and not the user that requests it. Furthermore, the virtual terminal can propose services corresponding to a certain number of criteria that may be programmable (accessibility from the room concerned, where appropriate adaptation according to the user profile, etc.).

A management method or system according to the invention allows various types of technology, in particular communicating object and location technologies, to coexist within one and the same system, independently of the way in which the various elements are distributed. It even allows new services to be implemented easily.

What is claimed:

1. A method of operating a system comprising a programmable processor for managing a set of communicating objects including service provider communicating objects and service consumer communicating objects, wherein a service directory lists information relating to at least a portion of said service provider communicating objects, with respect to services accessible from at least a portion of said service consumer communicating objects and to coverage areas respectively associated with said accessible services, the method comprising:

locating a service consumer communicating object using at least one of multi-sensor positioning systems, isolated sensors associated with software agents, and permanently entered positioning information, and identifying said service consumer communicating object with an identifier that uniquely identifies the service consumer communicating object, determining a first list of services different from the service directory, the first list being accessible from the service provider communicating objects listed in the directory, according to the location and the identification of the service consumer communicating object identified in relation to the services accessible from the service provider communicating objects and the coverage areas associated with said services, the first list of services comprising services relevant for the located and identified service consumer communicating object, the relevance of the services being determined according to a criteria based on the coverage areas of the services with regard to location information of the service consumer communicating object, and according to a criteria based on identification information of the service consumer communicating object;

initiating transmission, to the identified service consumer communicating object, of information relating to the services of said first list;

locating a service provider communicating object and identifying said service provider communicating object, and updating in the service directory the information relating to the services accessible from the identified service provider object and the associated coverage areas;

determining, for at least one of the services accessible from the identified service provider communicating object, a second list of service consumer communicating objects according to said service and the associated coverage area relative to the respective locations and identifications of the service consumer communicating objects, and initiating transmission of information relating to the services accessible from the identified service provider communicating object to the service consumer communicating objects of said second list.

2. The method as claimed in claim 1, further comprising:

determining in response to a request from a communicating object, a third list of services accessible from service provider communicating objects listed in the directory, according to the request and relative to the location and identification of the communicating object from which the request emanates, and initiating transmission of information relating to the services of said third list to said communicating object.

3. A system comprising a programmable processor for managing a set of communicating objects including service provider communicating objects and service consumer communicating objects, the system comprising:
- a memory storing a service directory listing information relating to at least a portion of the service provider communicating objects, with respect to services accessible from said at least some of the communicating objects and to coverage areas respectively associated with said accessible services;
- means of locating and identifying service consumer communicating objects, means of interpreting information for locating the service consumer communicating objects regarding coverage areas of the services listed in the directory;
- means of interpreting information for identifying the service consumer communication objects regarding the services listed in the directory;
- means of determining a first list of services different from the service directory, the first list being accessible from service provider communicating objects listed in the directory, according to results provided by the means of interpreting the information for locating and identifying the service provider communicating objects;
- means for initiating transmission of information relating to the services of said first list to a service consumer communicating object;
- means of identifying and locating service provider communicating objects;
- means of updating the service directory from information relating to the identification and location of the service provider communicating objects;
- means of determining, for at least one service accessible from an identified service provider communicating object, a second list of service consumer communicating objects according to said service and the associated coverage area relative to the respective locations and identifications of the service consumer communicating objects; and
- means for initiating at least the transmission of information relating to the services accessible from the identified service provider communicating object to service consumer communicating objects of said second list.

4. The system as claimed in claim 3, further comprising:
- means of, in response to a request from a communicating object, determining a third list of services accessible from service provider communicating objects listed in the directory, according to at least the request and relative to the location and identification of the communicating object from which the request emanates, and
- means for initiating transmission of information relating to the services of said third list to the communicating object.

* * * * *